United States Patent
Cherubini et al.

[11] Patent Number: 5,995,544
[45] Date of Patent: Nov. 30, 1999

[54] ADAPTIVE EQUALIZATION FOR PRIV TRANSMISSION SYSTEMS

[75] Inventors: Giovanni Cherubini, Rueschlikon; Sedat Oelçer, Au; Gottfried Ungerböck, Langnau, all of Switzerland

[73] Assignee: International Business Machines Corporation, Armonk, N.Y.

[21] Appl. No.: 08/836,494

[22] PCT Filed: Dec. 28, 1994

[86] PCT No.: PCT/EP94/04332

§ 371 Date: May 8, 1997

§ 102(e) Date: May 8, 1997

[87] PCT Pub. No.: WO96/20551

PCT Pub. Date: Jul. 4, 1996

[51] Int. Cl.[6] .................................................. H03H 7/30
[52] U.S. Cl. ........................ 375/232; 333/18; 333/28 R
[58] Field of Search .................................. 375/231, 232; 333/18, 28 R; 708/323

[56] References Cited

U.S. PATENT DOCUMENTS 5,319,674 6/1994 Cherubini ................................ 375/231
5,353,310 10/1994 Russell et al. .......................... 708/323
5,467,370 11/1995 Yamasaki et al. ..................... 708/323

*Primary Examiner*—Stephen Chin
*Assistant Examiner*—Kevin M Burd
*Attorney, Agent, or Firm*—Gerald R. Woods

[57] ABSTRACT

In a receiver for signals in a multilevel partial response class-IV communication system, the coefficients of a digital adaptive equalizer need to be updated to minimize the error due to noise and signal distortion. After initial convergence of the equalizer coefficients to near-optimum settings, an estimate of the mean-square error gradient for coefficient updating can be obtained in decision-directed mode from an estimate of the error signal. In the absence of a reference signal, initial convergence must be achieved in self-training mode. The decision-directed error signal is then replaced by a pseudo-error signal for the computation of an approximation of the mean-square error gradient. The invention provides a particular self-training procedure which outperforms known methods in terms of speed of convergence and achieved mean-square error values, and does not require timing recovery prior to equalizer convergence.

8 Claims, 5 Drawing Sheets

ADAPTIVE EQUALIZATION FOR PRIV TRANSMISSION SYSTEMS

The present invention is concerned with adaptive equalization, in particular with a method and an apparatus for self-training adaptive equalization in the receiver of a PRIV transmission system.

BACKGROUND

An adaptive digital equalizer is usually realized as a finite impulse response (FIR) filter, also known as a transversal filter. The filter output is obtained by linear combination of N signal samples stored in the equalizer delay line, i.e., $$y_n = C_n X_n^T \tag{1}$$

where $C_n = \{c_{0,n}, \ldots, c_{N-1,n}\}$ is the vector of equalizer coefficients and $X_n = \{x_n, \ldots, x_{n-N+1}\}$ is the vector of signal samples stored in the equalizer delay line at lime n. The filter coefficients are traditionally adjusted by the least-mean square (LMS) algorithm with the objective of minimizing noise and residual signal distortion at the filter output. In the LMS algorithm, an error signal is first computed. This error signal is then correlated with each signal sample stored in the delay line to generate an estimate of the gradient vector of the mean-square error (MSE). The vector of filter coefficients is finally updated by subtracting a term that is proportional to that estimate. In reference-directed mode of operation, the error signal is obtained as the difference between the equalizer output signal and a known reference signal. In decision-directed mode, the reference signal is replaced by the locally determined, most likely received signal among the discrete signals of the employed signal constellation.

In reference-directed mode, convergence of the equalizer coefficients to correct settings can always be achieved, provided the receiver has proper knowledge of a training sequence sent prior to random data signals. If after this training, the receiver makes decisions with sufficiently low probability of error, equalizer adaptation will operate reliably also in decision-directed mode. However, if the equalizer is not well trained at the beginning of decision-directed equalization, convergence will usually not be achieved except in the cases of binary modulation or pure phase modulation.

The sending of a training sequence and the means required to determine in a receiver the exact time when reception of a training sequence begins introduce complexities in the modem design and lead to communication overhead, which may not be desirable. The use of a training sequence may also be inappropriate for various situations. For example, in multipoint networks of modems it is usually not practical to send training sequences from a master modem to the receivers of slave modems, which may independently be activated or deactivated by their users.

When initial reference-directed equalizer adjustment by a training sequence is either undesirable or not possible, self-training equalization methods must be employed to train an equalizer from random data signals. These methods generally require much longer training periods than needed for reference-directed training. However, for many applications the length of these training times is quite tolerable.

Self-training methods usually rely on the definition of a pseudo-error, which on average will lead to correct coefficient adjustment although initially no reliable individual decisions can be obtained from the equalizer output signals.

A partial-response class-IV (PRIV) system is defined by its discrete-time channel symbol response, which in D-transform notation is given by $h_{PRIV}(D) = 1 - D^2$, where D denotes the operator for delay by one modulation interval T. Note that in a PRIV system, intersymbol interference is introduced in a controlled fashion. This distinguishes PRIV systems from full-response systems, where no intersymbol interference is present. If $a(D) = \ldots a_n D^n + a_{n+1} D^{n+1} + \ldots$ is the sequence of data symbols transmitted at the modulation rate 1/T, a sequence of correlated signal samples $b(D) = \ldots b_n D^n + b_{n+1} D^{n+1} = \ldots (a_n - a_{n-2}) D^n + (a_{n+1} - a_{n-1}) D^{n+1} + \ldots$ is obtained at the output of an ideal PRIV system. For example, for a quaternary PRIV system, the input symbols $a_n$ are taken from the set $\{-3, -1, +1, +3\}$ and the ideal channel output signal samples can assume one of the seven levels $\{-6, -4, -2, 0, +2, +4, +6\}$. In general, for an M-ary system, the input symbols are taken from the set $\{-(M-1), \ldots, -1, +1, \ldots, +(M-1)\}$ and the ideal channel output signal samples can assume one of the 2M-1 levels $\{-(2M-2), \ldots, -2, 0, +2, \ldots, +(2M-2)\}$. Note that max $|a_n| = M-1$.

The objective of an adaptive digital equalizer for a PRIV system is to provide an equalized signal of the form $$y_n = (a_n - a_{n-2}) + e_n = b_n + e_n \tag{2}$$

where $e_n$ is an error signal due to noise and residual signal distortion. As mentioned above, in decision-directed mode, the equalizer coefficients are updated by the LMS algorithm $$C_{n+1} = C_n - \alpha_{dd} \hat{e}_n X_n \tag{3}$$

where $\alpha_{dd}$ is the adaptation gain and $\hat{e}_n$ is an estimate of the error $e_n$. The estimate $\hat{e}_n$ is given by $$\hat{e}_n = y_n - (\hat{a}_n - \hat{a}_{n-2}) = y_n - \hat{b}_n \tag{4}$$

where $\hat{a}_n$ is a tentative decision on the transmitted symbol $a_n$.

Self-training equalization is generally more difficult to achieve for partial-response systems than for full-reponse systems. This is especially the case for partial-response systems where the input signal alphabet comprises more than two signal levels. Since self-training is always a slow process, the degree to which the modulation rate and the phase of the received signal are recovered prior to equalization plays an important role. Self-training methods can easily fail when the phase of the received signal is unknown and can drift relative to the phase of the local receiver clock.

Self-training adaptive equalization has in the past mainly been applied for full-response systems, cf. the following publications: (a) D. N. Godard, "Self recovering equalization and carrier tracking in two-dimensional data communication systems", IEEE Trans. Commun., Vol. COM-28, pp. 1867–1875 (November 1980); (b) S. Bellini, "Bussgang techniques for blind equalization", Proc. of IEEE GLOBCOM 1986, pp. 46.1.1–46.1.7 (December 1986); and (c) G. Picchi et al., "Blind equalization and carrier recovery using a "Stop-and-Go" decision directed algorithm", IEEE Trans. Commun., Vol. COM-35, pp. 877–887 (September 1987).

Methods to achieve self-training equalization for partial-response systems have been proposed for linear and for distributed-arithmetic equalizers in following publications: (d) Y. Sato, "A Method of Self-Recovering Equalization for Multilevel Amplitude-Modulation Systems", IEEE Trans. Commun., Vol. COM-23, pp. 679–682 (June 1975); and (e) G. Cherubini, "Nonlinear Self-Training Adaptive Equalization for Partial-Response Systems", IEEE Trans. Commun., Vol. COM-42, pp. 367–376 (February 1994).

For example, the self-training algorithm proposed in prior art publication (d) mentioned above for computing the adjustments of the coefficients of a linear equalizer in a multilevel PRIV system can be expressed by $$C_{n+1} = C_n - \alpha e_{S,n} X_n \quad (5)$$

where $\alpha > 0$ is the adaptation gain and $e_{S,n}$ is a pseudo-error. FIG. 1 shows an equivalent block diagram of this prior art self-training linear equalizer. The pseudo-error is generated by subtracting from the equalizer output $y_n$ a reconstructed PRIV signal $\hat{b}_{S,n}$, $$e_{S,n} = y_n - \hat{b}_{S,n}. \quad (6)$$

To obtain the signal $\hat{b}_{S,n}$, the equalizer output signal is first filtered by a filter with transfer characteristic $1/(1-\beta_S D^2)$, giving the signal $$u_{S,n} = y_n + \beta_S u_{S,n-2}, \quad (7)$$

where $0 < \beta_s < 1$. The transfer characteristic of this filter approximates the inverse of the transfer characteristic of an ideal PRIV channel, $1/(1-D^2)$. Since the frequency response of a PRIV channel exhibits spectral nulls at 0 Hz and at the frequencies $\pm \frac{1}{2}T$ Hz, the parameter $\beta_s$ cannot be chosen equal to one. This choice would correspond to "inverting the channel" and would result in infinite noise enhancement.

The signal $u_{S,n}$ is input to a two-level decision element that generates the signal $\gamma \text{sign}(u_{S,n})$, where $\gamma = E\{a_n^2\}/E\{|a_n|\}$. Finally, the reconstructed PRIV signal is obtained as $$\hat{b}_{S,n} = \gamma |\text{sign}(u_{S,n}) - \text{sign}(u_{S,n-2})|. \quad (8)$$

Prior art solutions have the following disadvantages. The MSE achievable by a particular self-training algorithm depends on the method used to generate the pseudo-error. The methods for self-training adaptive equalization described in prior art publications (d) and (e) have the disadvantage that the variances of the employed pseudo-errors do not diminish below significant values even if the true MSE after equalization would become small. This means that the useful driving force provided by the pseudo-error relative to its random fluctuations is generally very small and that low MSE can only be achieved at the expense of very, very slow convergence. In partial-reponse systems, the problem of slow convergence is further aggravated by the fact that the received signals are highly correlated. Therefore the prior art methods can only be applied for systems where satisfactory timing recovery prior to equalization is achieved. In the case of partial response systems, however, no simple solution exists for timing recovery prior to equalizer convergence. In some communication systems, timing recovery in a conventional sense is not even performed. In these systems, an equivalent function is obtained by operating the receiver at fixed local timing and letting the equalizer coefficients adapt to changing timing phase. Thus, the equalizing methods proposed in prior art publications (d) and (e) mentioned above cannot be applied.

OBJECTS OF THE INVENTION

It is one object of this invention to provide a method of self-training equalization for multilevel PRIV systems that achieves equalization in cases of significant distortion and unrecovered received signal timing where prior art techniques fail.

It is another object of the invention to devise a method and apparatus for adapting a digital equalizer in a communication receiver for PRIV signals, which in a self-training mode uses a new type of pseudo-error leading to fast equalizer convergence and steady-state MSE close to the minimum achievable MSE. The self-training equalizer can thus be used in receivers where timing recovery cannot be completed prior to equalization, and in systems where the sampling phase of the local receiver may drift relative to the phase of the remote transmitter clock.

These objects are achieved by an iterative method of adapting a digital equalizer as defined in the method claims and by an equalizer apparatus as defined in apparatus claims.

An embodiment of the invention is described in the sequel with reference to following drawings.

LIST OF FIGURES

DETAILED DESCRIPTION OF THE INVENTION

Figure 1:
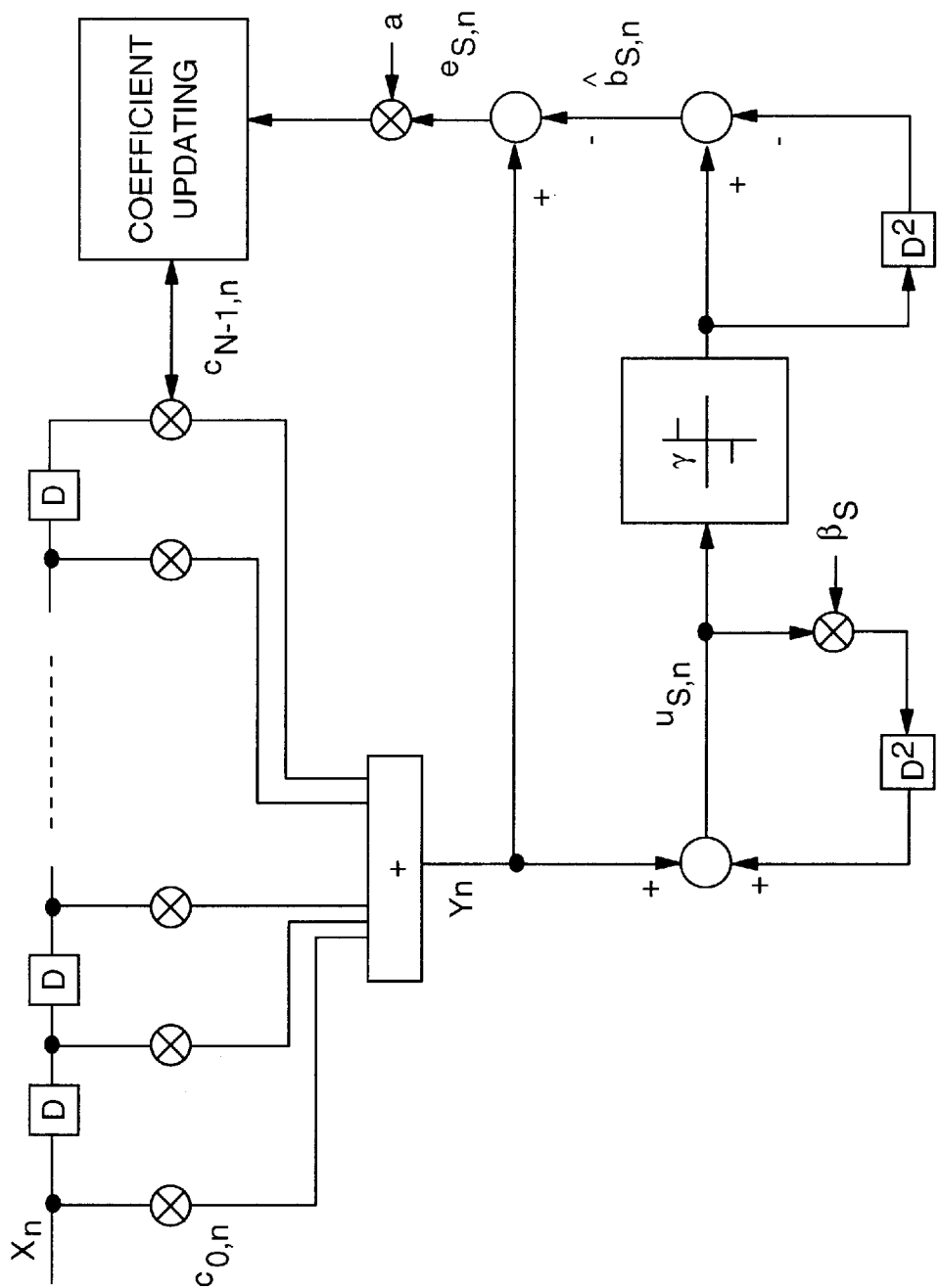
FIG. 1 is a block diagram of a prior art adaptive digital equalizer.
Figure 2:
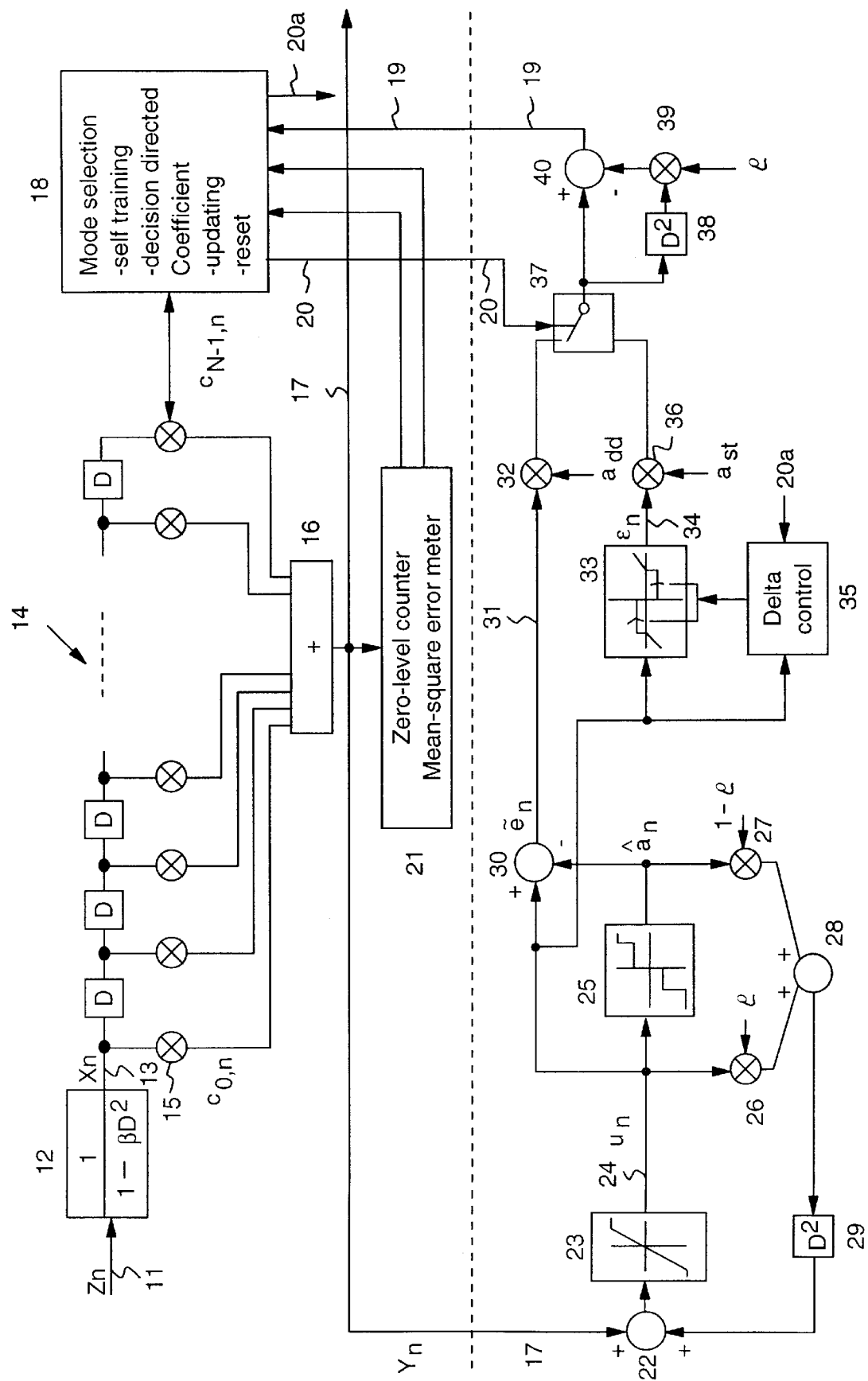
FIG. 2 is a block diagram of the fundamental design of an adaptive digital equalizer incorporating the invention.

FIG. 2 shows a block diagram of the self-training linear equalizer that represents the subject of this invention. The upper portion represents conventional elements of the equalizer. The lower portion illustrates the elements for generating an error signal according to the invention.

The signal samples $z_n$ received on input line 11 are partially decorrelated by a filter 12 with transfer characteristic $1/(1-\beta D^2)$, where $0 < \beta < 1$. The obtained signal samples $x_n$, are transferred on line 13 into the equalizer delay line 14. The N samples stored in the delay line are multiplied by coefficients $c_{i,n}$ held in registers 15, and the products are combined in adder 16 to obtain the output signal $y_n$ on lines 17. The output of the linear equalizer is given by equation (1) that was presented above. The objective of the adaptive digital equalizer is to obtain an overall $1-D^2$ channel characteristic at the output of the equalizer, i.e., $y_n$ is expressed by equation (2).

Circuitry 18 is provided for various operations. Using the error signal appearing on lines 19, it updates the coefficients held in registers 15 in each iteration interval. Initially, it resets the coefficients to predetermined values. Circuitry 18 further selects the appropriate mode of operation, i.e., decision-directed mode or self-training mode, and furnishes a respective binary selector signal S-TR on line 20. The decision is made in response to control signals which are provided by control section 21 which receives the equalizer output signal $y_n$, and which has a zero-level counter and a mean-square error meter. Circuitry 18 also furnishes, at the start of operation, a reset signal EQU-RES on line 20A for resetting certain elements required for generating a pseudo-error signal.

In the next sections, there is first described the generation of an error signal $\tilde{e}_n$ obtained from tentative M-ary decisions. This error signal is employed for updating the equalizer coefficients in a decision-directed mode. Then follows an explanation of the computation of a pseudo-error signal $\epsilon_n$ that is used in self-training mode to achieve initial equalizer convergence.

The signal $u_n$ (cf. FIG. 2, lower left portion) is given by $$u_n = y_n + \rho u_{n-2} + (1-\rho)\hat{a}_{n-2} \quad (9)$$

and the error signal $\tilde{e}_n$ is defined as $$\tilde{e}_n = u_n - \hat{a}_n. \tag{10}$$

Equation (9) is explained as follows. Since the equalizer output signal $y_n$ is ideally a partial-response signal, tentative decisions $\hat{a}_n$ can be obtained by filtering $y_n$ by a filter with characteristic $1/(1-D^2)$. Channel inversion corresponds to the choice of $\rho=1$ in (9). The signal $u_n$ would then be given by the recursive expression $u_n = y_n + u_{n-2}$. Using $y_n = a_n - a_{n-2} + e_n$, one obtains in D-transform notation $$u(D) = a(D) + \frac{e(D)}{1-D^2}. \tag{11}$$

As was observed already, this choice of $\rho=1$ would lead to infinite noise enhancement at the frequencies f=0 and $\pm\frac{1}{2}T$ Hz. Alternatively, noise enhancement can be avoided if past tentative decisions are employed to compute the current tentative decision. This case corresponds to the choice of $\rho=0$ in (9). The signal $u_n$ is then given by $u_n = y_n + \hat{a}_{n-2}$. Assuming correct past decisions $\hat{a}_{n-2} = a_{n-2}$, one finds $$u(D) = a(D)(1-D^2) + e(D) + a(D)D^2 = a(D) + e(D). \tag{12}$$

In this case, however, tentative-decision errors lead to error propagation. An appropriate choice is $0 \leq \rho < 1$ to achieve a compromise between noise enhancement and error propagation. Therefore one obtains $$u(D) = a(D) + \frac{e(D)}{1-\rho D^2}. \tag{13}$$

From (9), the equalizer output signal can be expressed as $$y_n = u_n - \rho u_{n-2} - (1-\rho)\hat{a}_{n-2} + (a_n - a_{n-2}) - (a_n - a_{n-2}). \tag{14}$$

Assuming again correct past decisions one finds $$y_n = (a_n - a_{n-2}) + \tilde{e}_n - \rho \tilde{e}_{n-2}. \tag{15}$$

Therefore, the LMS algorithm (3) needs to be modified as follows:

$$C_{n+1} = C_n - \alpha_{dd}(\tilde{e}_n - \tilde{e}_{n-2})X_n. \tag{16}$$

In decision-directed mode, error propagation is negligible, so that $\rho=0$ can be used and $\tilde{e}_n \cong e_n$. However, algorithm (16) would not converge in the presence of significant error propagation.

In self-training mode, a pseudo-error $\epsilon_n$ is defined to update the equalizer coefficients $$\varepsilon_n = \begin{cases} u_n - \hat{a}_n & \text{if } |u_n| \geq M-1 \\ -\delta_n \, \text{sign}(u_n) & \text{otherwise} \end{cases} \tag{17}$$

where $\delta_n$ is a positive value that is updated at each iteration as follows:

$$\delta_{n+1} = \begin{cases} \delta_n - \Delta_1 & \text{if } |u_n| \geq M-1 \\ \delta_n + \Delta_2 & \text{otherwise} \end{cases} \tag{18}$$

and $\Delta_1$, $\Delta_2$ are positive constants.

In a quaternary PRIV system with $a_n \in \{-3, -1, +1, +3\}$, M−1 can be replaced by 3 in equations (17) and (18). In the sequel, quaternary transmission (M=4) is assumed.

The generation of the pseudo-error $\epsilon_n$ is based on the a priori knowledge of the statistics of the signal $u_n$. In the case of ideal equalization and absence of noise, $u_n$ would assume the same probability distribution as the quaternary channel input symbols $a_n$. Therefore, whenever the event $|u_n| \geq 3$ is observed, one can reliably use $u_n - \hat{a}_n$ as an error signal to update the equalizer coefficients, since $\hat{a}_n = 3\text{sign}(u_n)$ with probability close to one. However, nothing can reliably be said about the value of the error if the event $|u_n| < 3$ is observed. In this case, one can choose to update the equalizer coefficients so that the rate of occurrence of the event $|u_n| < 3$ becomes close to its a priori probability, which in the presence of noise and residual signal distortion is approximately equal to ¾. This is achieved by setting the pseudo-error equal to $-\delta_n \, \text{sign}(u_n)$ whenever $|u_n| < 3$ and updating the value of $\delta_n$ at each iteration so that $\delta_n$ becomes larger if the event $|u_n| < 3$ occurs more often than expected, and $\delta_n$ becomes smaller otherwise.

The modified LMS algorithm for self-training adaptive equalization is then given by $$C_{n+1} = C_n - \alpha_{st}(\epsilon_n - \rho \epsilon_{n-2})X_n, \tag{19}$$

where $\alpha_{st}$ is the adaptation gain. In self-training mode, best convergence behavior of the equalizer coefficients is obtained for $\rho \cong \frac{1}{2}$. At the beginning of the self-training mode, the equalizer coefficients are initialized to the values $\{0, \ldots, 0, +1, 0, -1, 0, \ldots, 0\}$ and the value of $\delta_n$ is initialized to 0.25.

The circuitry for generating the error signals according to the principles explained above, and which is shown in the lower portion of FIG. 2, will now be described. Blocks 22–29 serve for generating the intermediate signal $u_n$. Element 22 adds the equalizer output signal and a feedback signal generated by the other elements. The sum signal is limited by element 23 between two values, to produce on line 24 the intermediate signal $u_n$. For developing the estimated signal $\hat{a}_n$ a quantizing element 25 is provided which selects in response to the signal $u_n$, one of the possible values (in the example four values) which the symbol $a_n$ can assume. In multiplying elements 26 and 27, the products $\rho u_n$ and $(1-\rho)\hat{a}_n$ are generated, respectively. The products are added in element 28 and delayed by two sampling periods in delay element 29 which on its output furnishes the feedback signal. Element 30 subtracts the estimate $\hat{a}_n$ from $u_n$ and furnishes on its output line 31 the error signal $\tilde{e}_n$ which is multiplied in element 32 by the gain factor $\alpha_{dd}$ for decision-directed mode.

Further elements 33–36 are provided for generating the pseudo-error signal to be used in the self-training mode. Element 33 generates on its output 34 the signal $\epsilon_n$ in response to the intermediate signal $u_n$ on line 24 and a value $\delta_n$ provided by delta control 35, in accordance with equation (17). Value $\delta_n$ is generated in response to signal $u_n$ according to equation (18). Resetting of $\delta_n$ at start of operation is effected by the control signal on line 20A. The error signal on line 34 is multiplied in element 36 by the gain factor $\alpha_{st}$ employed for the self-training mode.

Selection circuit 37, in response to the mode selection signal on line 20, transfers the one or the other error signal to processing elements 38, 39 and 40 for generating the actual error signal on error signal line 19.

Figure 3:
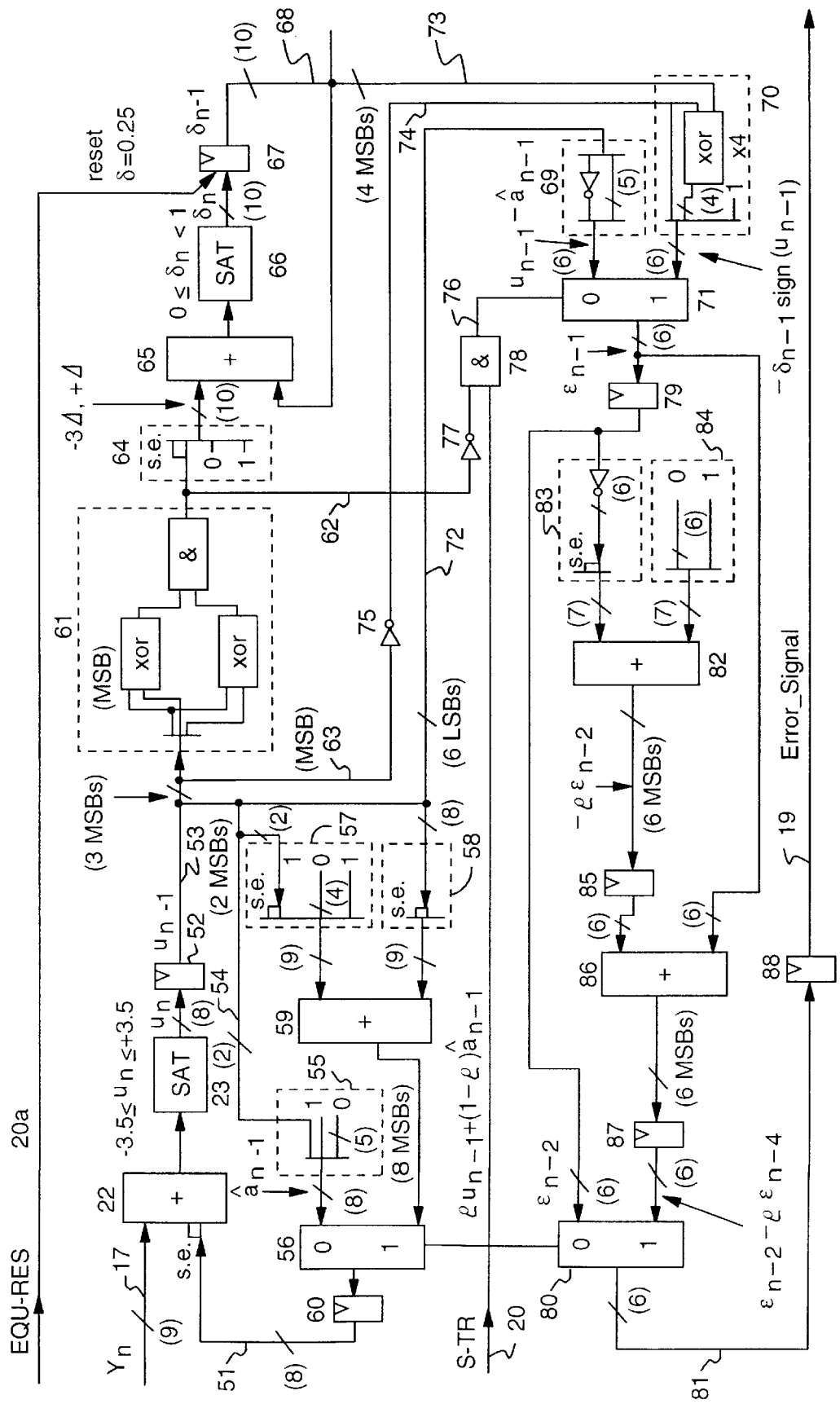
FIG. 3 is a block diagram of a particular implementation of the error signal generating portions of the equalizer of FIG. 2.

FIG. 3 shows more detailed circuitry for the generation of error signals in the adaptive equalizer of the invention. This circuitry corresponds to the lower portion of the equalizer shown in FIG. 2. However, it is a particular embodiment that combines certain operations in a specific way to save circuit elements where possible. Where the same circuit elements appear in both FIG. 2 and FIG. 3, they are designated by the same reference numbers.

The following conditions are valid for the embodiment shown in FIG. 3 and are listed here separately to simplify understanding of the description.

Number Representation

The values of the signal samples are represented in the binary system, in two's complement representation.

The samples $u_n$ and $â_n$ are represented by eight bits, binary point after third position from the left.

The positive value $δ_n$ is represented by 10 bits, binary point before first position on the left.

The error $ε_n$ is represented by 6 bits, binary point after first position from the left.

Values of $a_n$

The symbol $a_n$ can assume four different values in the example: −3, −1, +1, +3 (quaternary PRIV system).

Generation of Estimate $â_n$

To achieve proper approximation, the intermediate signal $u_n$ is limited between −3.5 and +3.5. The tentative decisions $â_n$ are obtained from the two most-significant bits of the signal $u_n$. The first bit determines the sign of $â_n$. The second bit indicates whether the current value of $u_n$ is closer to ±3 or closer to ±1. The third bit of $â_n$ is always set equal to one. The remaining bits of $â_n$ are set to zero.

Value of Factor ρ

This is selected to be ρ=0 for decision-directed mode and ρ=½ for self-training mode. Thus, a multiplication by ρ in self-training mode is effected by shifting the binary digits of the operand by one position to the right.

Initial Value of $δ_n$

This value is reset to ¼ at start of the equalizer operation (indicated by a signal EQU-RES).

Values of $Δ_1$ and $Δ_2$

These values which are required for updating $δ_n$ were selected to be $Δ_1=3Δ$ and $Δ_2=Δ$, where $Δ=2^{−10}$.

Distinction between Decision-directed and Self-training Modes

The signal S-TR indicates self-training mode when it is "1", and decision-directed mode when it is "0". This signal is developed outside of the circuitry of FIG. 3, as was explained in the description of FIG. 2 (upper portion). See also the short description of mode selection and generation of control signals, further below.

Sign Extension

The most-significant bit (MSB) of a value in two's complement representation is extended as many times as necessary towards the left. Sign extension is indicated by "s.e." in the drawing.

Details of FIG. 3

Input lines 17 carry the output signal $y_n$ of the equalizer. It is added in adder 22 to a feedback signal appearing on line 51 which is developed as follows. The output signal of adder 22 is limited between two given values (−3.5 and +3.5 in present example) in circuit SAT 23. The limited signal $u_n$ is transferred into clocked register 52. Each of the clocked registers shown in FIG. 3 determines a delay of one modulation interval, so that the output of register 52 is an 8-bit signal $u_{n−1}$ on lines 53. The two most significant bits are branched off on lines 54. For generating the signal $â_{n−1}$, a binary 1 is appended to these two most signifcant bits, followed by zeros, in circuitry 55. Signal $â_{n−1}$ produced by circuitry 55 is transferred into one input of selector 56. The signal $ρu_{n−1}+(1−ρ)â_{n−1}$ is generated by circuitry 57, 58 and adder 59. It should be remembered that in present example, since ρ was selected to be ½ (for self-training mode), a multiplication by both ρ and (1−ρ) can be effected by shifting right the respective operand by one position. In circuit 57, the two most significant bits of lines 54 are shifted one position, sign extended (s.e.), a binary one bit is appended, and the remaining positions are filled by zeros (except for the last position to achieve rounding). Thus, circuit 57 generates the term $(1−ρ)â_{n−1}$. In circuit 58, signal $u_{n−1}$ is multiplied by ½ by effecting a shift to the right, and sign extended. The resulting signal $ρu_{n−1}$ is transferred into the other input of adder 59, which on its output furnishes the term $ρu_{n−1}+(1−ρ)ân−1$mentioned above to selector 56.

Selector 56 is controlled by the self-training indicator signal S-TR on line 20. Depending on the present mode, the appropriate correction term which appears on lines 51 is delayed by clocked register 60 and added to output signal $y_n$.

Circuit 61 serves for developing a signal on its output line 62 which indicates whether the absolute value of the intermediate signal $u_{n−1}$ is greater than or equal to M−1, which in present example is 3. For developing this indicator signal, detector circuit 61 receives on its inputs the three most significant bits of $u_{n−1}$, appearing on lines 53, and separately on line 63 the most significant bit which represents the sign of $u_{n−1}$.

Circuit elements 64, 65, 66 and 67 are provided for updating the signal $δ_n$, according to the algorithm given in equation (18). Signal $δ_{n−1}$ appears on lines 68. It is fed back to one input of adder 65. The other input receives, from circuit 64, either the value $−Δ_1=−3Δ$ or the value $A_2=Δ$, depending on whether the binary signal on line 62 indicates that $|u_{n−1}|$ is greater than or equal to 3 or not. The updated value of $δ_n$ appearing at the output of adder 65 is limited in circuit SAT 66 between zero and one. The limited value is furnished to clocked register 67. Note that when operation of the equalizer is started, a reset signal EQU-RES on line 20A sets the contents of register 67 to a value equal to ¼ (in binary notation 0.0100000000). All elements for updating $δ_n$ are provided 10 bits wide.

Elements in the lower half of the circuitry shown in FIG. 3 serve for actually developing the error signals. Blocks 69, 70 and 71 are provided for generating the signal $ε_{n−1}$ according to the algorithm of equation (17). Note that all these elements are provided 6 bits wide. Circuit 69 develops the term $u_{n−1}−â_{n−1}$ on its output. It receives the 6 least significant bits of $u_{n−1}$ on lines 72. These bits yield the required difference between $u_{n−1}$ and $â_{n−1}$, provided that the first one of the 6 least significant bits is inverted.

Circuitry 70, for developing the term $−δ_{n−1}sign(u_{n−1})$ receives on its inputs the four most significant bits of $δ_{n−1}$ on lines 73, and the inverted sign of $u_{n−1}$ on line 74, generated in inverter 75 from the actual sign value appearing on line 63. The XOR circuit serves for inverting the bits of $δ_{n−1}$ in case the sign of $u_{n−1}$ is positive. The sixth bit is set to 1 to effect rounding. The output signals of circuits 69 and 70 are fed to selector 71 which furnishes on its output the one or the other of its input signals, as error signal $ε_{n−1}$. The selection signal on line 76 is developed, using inverter 77 and AND circuit 78, from the self-training indicator signal S-TR on line 20, and from the detector signal on line 62 indicating whether $|u_{n−1}|≧3$ or not.

The signal $ε_{n−1}$ is stored in clocked register 79. The output $ε_{n−2}$ of clocked register 79 is directly furnished to selector 80, which provides this signal as error signal $\tilde{e}_{n−2}$ on lines 81 during decision-directed mode.

The remaining circuitry serves for generating the pseudo-error signal required during self-training mode. To obtain the term $−ρε_{n−2}$ on the output of adder 82, a multiplication by ½ and an inversion is necessary. In circuitry 83, all bits of $ε_{n−2}$ are inverted, shifted by one position to the right and sign extended; circuit 84 provides a binary one in the least significant position which is added to the output of circuit 83 to correctly obtain the result in two's complement representation. The result is stored in clocked register 85 whose output $(-\rho\epsilon_{n-3})$ is added in adder 86 to $\epsilon_{n-1}$ available from the output of selector 71. The result is stored in clocked register 87 which, at its output, furnishes the required error signal $\epsilon_{n-2}-\rho\epsilon_{n-4}$. Selector 80 provides this pseudo-error signal on lines 81 during self-training mode.

The developed error signal for both decision-directed and self-training mode, is kept in clocked register 88 and then available in the next sampling interval on lines 19, for updating the equalizer coefficients (in circuit 18 of FIG. 2).

Mode Selection and Generation of Control Signals

In control section 21 of the equalizer (cf. FIG. 2), the MSE $E\{e_n^2\}$ at the equalizer output is continuously monitored using seven-level tentative decisions. If it is too large, self-training adaptive equalization is to be performed during a fixed time interval, and the signal S-TR=1 is furnished by circuitry 18 on line 20 during that time. At the end of the time interval, if the MSE is sufficiently small, equalizer operation is to be continued with the decision-directed LMS algorithm, and control signal S-TR=0 is then furnished on line 20. To prevent convergence of the equalizer coefficients to the all-zero vector, if a large number of consecutive small equalizer output signals are observed, the equalizer is reset, the signal EQU-RES on line 20A is set to one, and self-training is started.

No elements are shown in FIG. 3 for multiplying the error signals in decision-directed or self-training mode by the gain factors $\alpha_{dd}$ and $\alpha_{st}$, respectively. Such elements could easily be inserted, if required. Selecting these gain signals as a power of 2 leads to a simple implementation.

Investigation of Convergence Behavior

Figure 4:
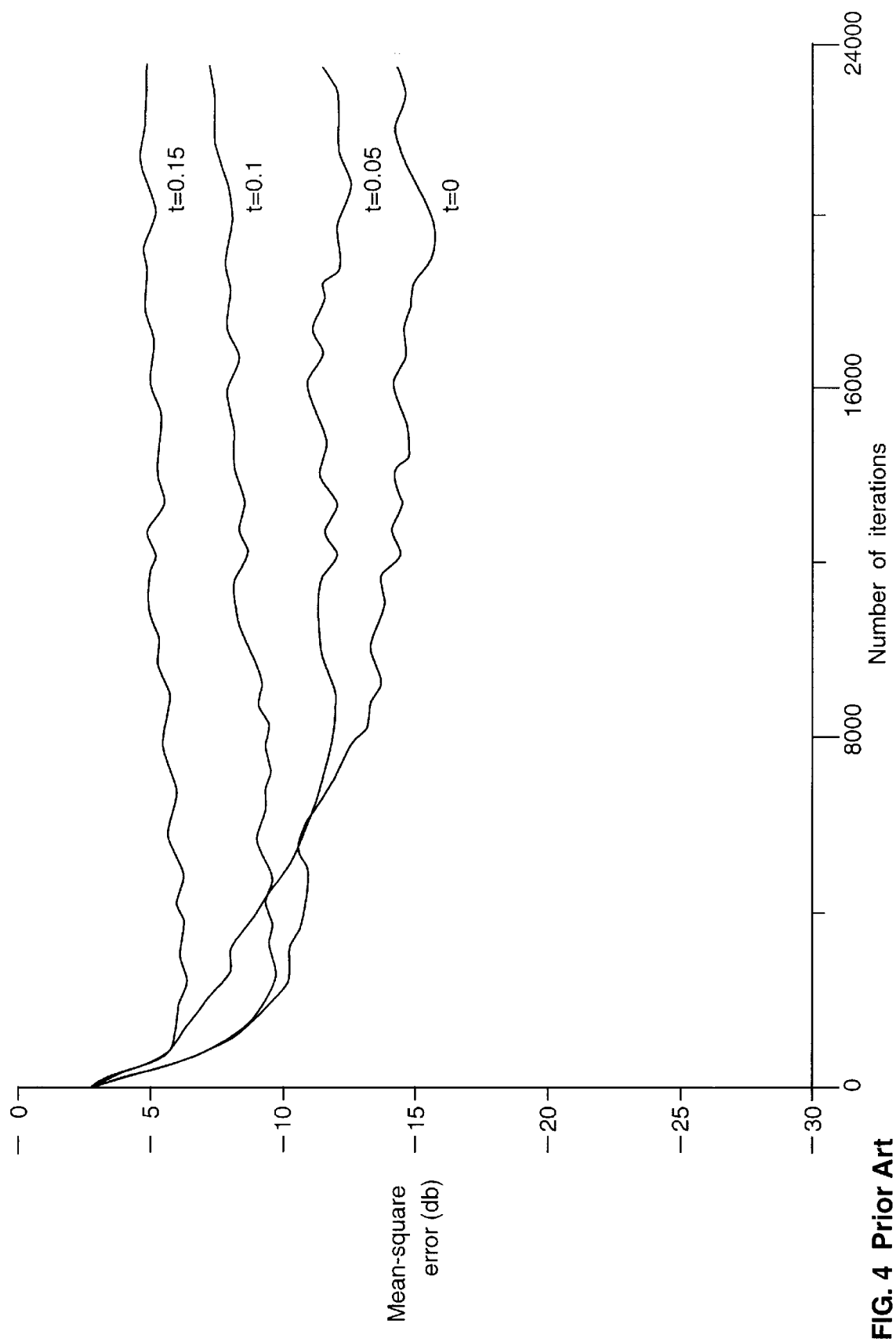
FIGS. 4 and 5 are diagrams illustrating the convergence behavior of the mean-square error for equalizing methods of the prior art and of present invention, respectively.
Figure 5:
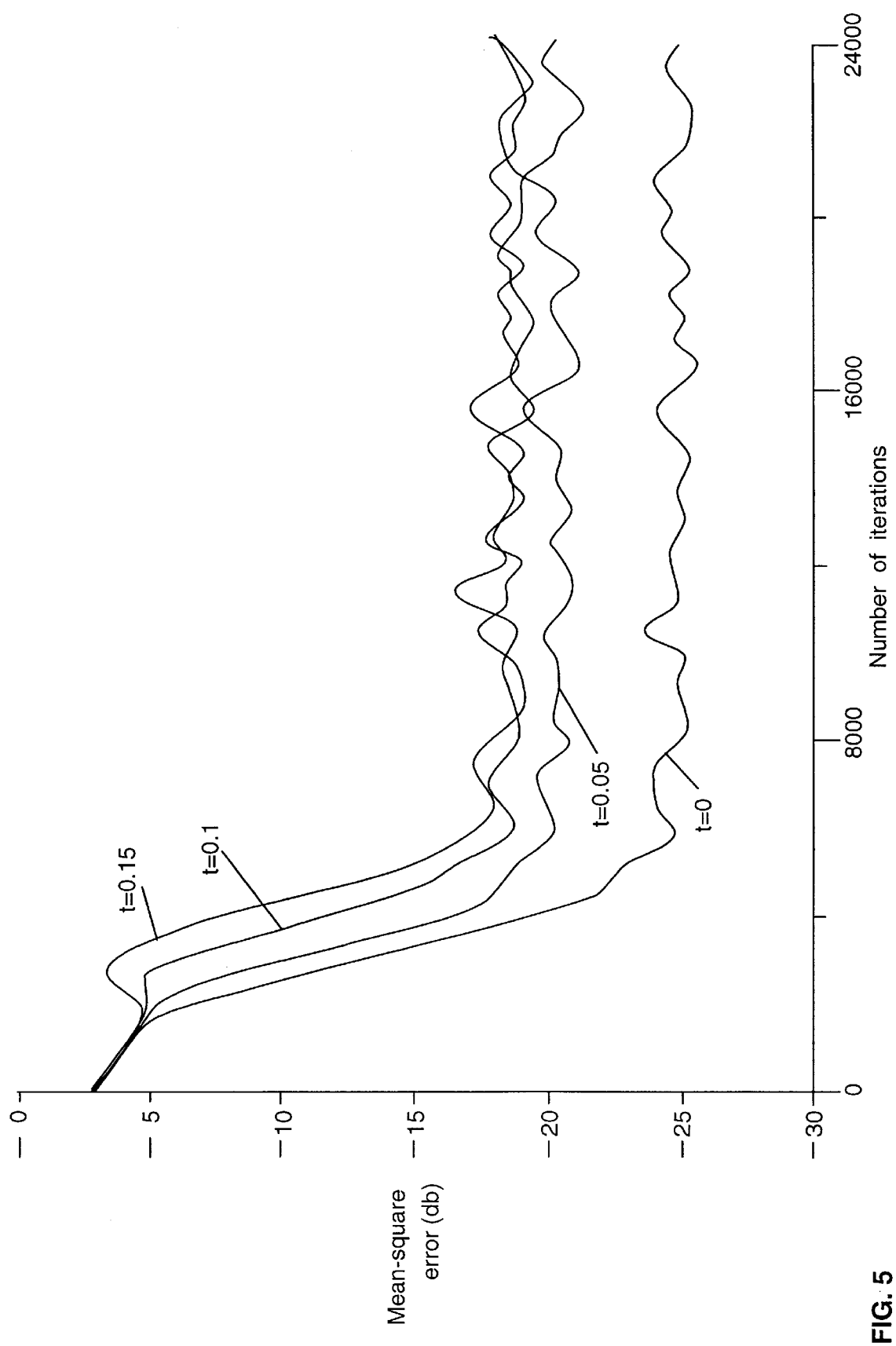

The convergence behavior and steady-state mean-square error performance of the proposed adaptive equalization method according to equation (19) have been investigated for a cable transmission system with QPRIV transceivers. For comparison purposes, also the performance of a prior art self-training adaptive equalizer operating according to equation (5) has been investigated. Various realizations of the convergence of the MSE at the output of a self-training equalizer with N=16 coefficients are shown in FIG. 4 and FIG. 5 for the prior art algorithm and for the method of present invention, respectively. 125 Mbit/s quaternary transmission over unshielded twisted-pair cables of category 3 (UTP-3) of length 50 m is assumed. The curves are parametrized by $t=\Delta T/T$, where T=16 ns is the modulation interval and $\Delta T$ denotes the difference between the sampling phase of the channel output signal and the best sampling phase that yields minimum mean-square error. The new equalization method results in faster convergence as compared to a method using equation (5). and the obtained MSE values are significantly lower.

We claim:

1. Iterative method for adapting an equalizer in self-training mode in the receiver for signals in a PRIV transmission system;

said signals representing transmission symbols $a_n$ which can assume any one of a set of M discrete values $\{-(M-1), \ldots, -1, +1, \ldots, +(M-1)\}$; said equalizer storing received input samples $x_n$, and storing a set $C_n$, of equalizer coefficients $\{c_{0,n} \ldots c_{N-1,n}\}$ that are updated at each iteration; an equalizer output sample $y_n$ being generated at each iteration;

said method being characterized by the steps of:

obtaining an intermediate signal sample $u_n$ according to $$u_n = y_n + \rho u_{n-2} + (1-\rho)\hat{a}_{n-2}$$

wherein $\rho$ is a value between 0 and 1, and $\hat{a}_n$ is obtained by quantizing $u_n$ to one of said discrete values and is an estimate of a transmitted symbol $a_n$;

generating a pseudo-error signal $\epsilon_n$ from said intermediate signal sample $u_n$ according to $$\epsilon_n = u_n - \hat{a}_n \text{ if } |u_n| \geq M-1$$

and $$\epsilon_n = -\delta_n \text{ sign}(u_n)$$

otherwise, wherein the parameter $\delta_n$ is a non-negative value; updating said set of equalizer coefficients according to $$C_{n+1} = C_n - \alpha_{st}(\epsilon_n - \rho\epsilon_{n-2})X_n$$

wherein $\alpha_{st}$ is a predetermined adaptation gain, and $X_n$ is the current set of stored input samples, comprising the input samples $X_n \ldots X_{n-N+1}$.

2. The method of claim 1, characterized by switching said receiver from said self-training mode to decision directed mode, in particular when the value of the mean-square error MSE becomes smaller than a predetermined value or after a predetermined time.

3. The method of claim 1, characterized by the following additional steps:

initially setting said parameter $\delta_n$ to a predetermined positive value, and updating said parameter $\delta_n$ at each iteration according to $$\delta_{n+1} = \delta_n - \Delta_1 \text{ if } |u_n| \geq M-1$$

and $$\delta_{n+1} = \delta_n + \Delta_2$$

otherwise, wherein $\Delta_1$ and $\Delta_2$ are predetermined positive constants.

4. The method of claim 1, characterized by the additional step of:

limiting the value of said intermediate signal sample $u_n$ between a predetermined positive and a predetermined negative limit, respectively, the absolute values of said positive and said negative limits being greater than M-1.

5. The method of claim 1, characterized by the additional steps of:

at the input of said receiver, receiving signal samples $z_n$ representing transmitted random signals, and partially decorrelating said signal samples $z_n$ by a filter with transfer characteristic $1/(1-\beta D^2)$, wherein $0 \leq \beta < 1$, to obtain said input samples $x_n$.

6. A self-training adaptive equalizer in the receiver for signals in a PRIV transmission system;

said signals representing transmission symbols $a_n$ which can assume any one of a set of M discrete values $\{-(M-1), \ldots, -1, +1, \ldots, +(M-1)\}$; said equalizer comprising storage means, in particular a delay line, for storing received input samples $x_n$; said equalizer furnishing an output signal $y_n$ and including means for generating error signals in response to said output signal $y_n$;

characterized in that it comprises the following circuitry for generating a pseudo-error signal for updating equalizer coefficients in a self-training mode:

means (22 . . . 29; 51 . . . 60) for generating an intermediate signal $u_n$ according to $$u_n = y_n + \rho u_{n-2} + (1-\rho) \hat{a}_{n-2},$$

wherein $\rho$ is a value between 0 and 1, and $\hat{a}_n$ is obtained by quantizing $u_n$ to one of said discrete values and is an estimate of a transmitted symbol $a_n$;

means (33 . . . 35; 69 . . . 79) for generating said pseudo-error signal $\epsilon_n$ from said intermediate signal according to $$\epsilon_n = u_n - \hat{a}_n \text{ if } |u_n| \geq M-1$$

and $$\epsilon_n = -\delta_n \text{ sign}(u_n)$$

otherwise, wherein the parameter $\delta_n$ is a non-negative value.

7. The equalizer of claim 6, characterized by means (35; 64 . . . 68) for updating said parameter $\delta_n$ according to $$\delta_{n+1} = \delta_n - \Delta_1 \text{ if } |u_n| \geq M-1$$

and $$\delta_{n+1} = \delta_n + \Delta_2$$

otherwise, wherein $\Delta_1$ and $\Delta_2$ are predetermined positive constants.

8. The equalizer of claim 6, characterized by additional means (23) for limiting said intermediate signal $u_n$ between a predetermined positive limit and a predetermined negative limit, respectively.

* * * * *